(12) United States Patent
Zhao et al.

(10) Patent No.: US 12,043,144 B2
(45) Date of Patent: Jul. 23, 2024

(54) LONG RAIL ASSEMBLY FOR VEHICLE SEAT ADJUSTMENT

(71) Applicant: Magna Seating Inc., Aurora (CA)

(72) Inventors: Kai Zhao, Rochester Hills, MI (US);
Michael D Nacy, Lake Orion, MI (US);
Detjon Marini, White Lake, MI (US);
Louis Vetere, II, Commerce Township, MI (US); Cheikh Dioum, Farmington Hills, MI (US)

(73) Assignee: Magna Seating Inc, Aurora (CA)

( * ) Notice: Subject to any disclaimer, the term of this patent is extended or adjusted under 35 U.S.C. 154(b) by 650 days.

(21) Appl. No.: 17/284,510

(22) PCT Filed: Oct. 11, 2019

(86) PCT No.: PCT/US2019/055835
§ 371 (c)(1),
(2) Date: Apr. 12, 2021

(87) PCT Pub. No.: WO2020/077209
PCT Pub. Date: Apr. 16, 2020

(65) Prior Publication Data
US 2021/0370804 A1    Dec. 2, 2021

Related U.S. Application Data

(60) Provisional application No. 62/744,357, filed on Oct. 11, 2018.

(51) Int. Cl.
*B60N 2/02*    (2006.01)
*B60N 2/015*    (2006.01)
(Continued)

(52) U.S. Cl.
CPC ............ *B60N 2/067* (2013.01); *B60N 2/015* (2013.01); *B60N 2/02246* (2023.08);
(Continued)

(58) Field of Classification Search
CPC .... B60N 2/015; B60N 2/02246; B60N 2/067; B60N 2/0702; B60N 2/0715;
(Continued)

(56) References Cited

U.S. PATENT DOCUMENTS

| 5,094,420 A | 3/1992 | Aihara et al. |
| 5,323,998 A * | 6/1994 | Aihara .................. B60N 2/067 248/419 |

(Continued)

FOREIGN PATENT DOCUMENTS

| CN | 104487282 | 4/2015 |
| CN | 108162813 | 6/2018 |

(Continued)

*Primary Examiner* — Jonathan Liu
*Assistant Examiner* — Guang H Guan
(74) *Attorney, Agent, or Firm* — Miller Canfield

(57) ABSTRACT

A long rail assembly attached to a vehicle floor for repositioning vehicle seats in a vehicle between a plurality of seating positions. The long rail assembly includes a fixed long rail having an internal channel, and a power rail drive assembly configured to travel along the internal channel of the fixed long rail. The power rail drive assembly has a rail main body having a lateral driving wheel configured to frictionally and/or meshingly engage with the fixed long rail, an electric motor operatively coupled to the lateral driving wheel, and spring-loaded stability rolling elements attached to the rail main body configured to absorb channel variation as the power rail drive assembly travels along the internal channel of the fixed long rail.

22 Claims, 14 Drawing Sheets

(51) Int. Cl.
*B60N 2/06* (2006.01)
*B60N 2/07* (2006.01)
*B60N 2/08* (2006.01)

(52) U.S. Cl.
CPC ......... *B60N 2/0715* (2013.01); *B60N 2/0818* (2013.01); *B60N 2/0875* (2013.01); *B60N 2/02253* (2023.08)

(58) Field of Classification Search
CPC .. B60N 2/0812; B60N 2/0818; B60N 2/0831; B60N 2/0862; B60N 2/0875
USPC .......................................... 248/424, 429, 430
See application file for complete search history.

(56) References Cited

U.S. PATENT DOCUMENTS

| | | | | |
|---|---|---|---|---|
| 5,961,088 | A * | 10/1999 | Chabanne | B60N 2/0818 248/429 |
| 6,691,971 | B2 | 2/2004 | Yamada et al. | |
| 7,331,558 | B2 | 2/2008 | Jeong | |
| 8,844,891 | B2 | 9/2014 | Yamada et al. | |
| 9,126,505 | B2 * | 9/2015 | Moriyama | B60N 2/0722 |
| 10,011,195 | B2 | 7/2018 | Kume et al. | |
| 10,059,230 | B2 * | 8/2018 | Kume | A47C 1/12 |
| 10,220,731 | B2 * | 3/2019 | Kume | B60N 2/0707 |
| 10,759,311 | B2 * | 9/2020 | Petit | B60N 2/0881 |
| 11,577,630 | B2 * | 2/2023 | Komiyama | B60N 2/07 |
| 11,584,264 | B2 * | 2/2023 | Runde | B60N 2/02246 |
| 11,597,303 | B2 * | 3/2023 | Zhao | B60N 2/01541 |
| 11,660,986 | B2 * | 5/2023 | Shim | B60N 2/067 248/430 |
| 11,679,694 | B2 * | 6/2023 | Zhao | B60N 2/0875 248/429 |
| 11,794,613 | B2 * | 10/2023 | Zhao | B60N 2/0715 |
| 2010/0129013 | A1 * | 5/2010 | Schroeder | F16C 29/045 29/428 |
| 2018/0086230 | A1 | 3/2018 | Kume et al. | |
| 2018/0086232 | A1 | 3/2018 | Kume et al. | |
| 2018/0126875 | A1 | 5/2018 | Kume et al. | |
| 2019/0084453 | A1 | 3/2019 | Petit et al. | |
| 2021/0370804 | A1 * | 12/2021 | Zhao | B60N 2/0875 |
| 2022/0017000 | A1 * | 1/2022 | Zhao | B60N 2/06 |
| 2022/0161691 | A1 * | 5/2022 | Zhao | B60N 2/07 |
| 2022/0219569 | A1 * | 7/2022 | Zhao | B60N 2/08 |
| 2023/0062149 | A1 * | 3/2023 | Zhao | B60N 2/01508 |
| 2023/0294564 | A1 * | 9/2023 | Zhao | B60N 2/06 248/429 |
| 2023/0391230 | A1 * | 12/2023 | Zhao | B60N 2/02253 |

FOREIGN PATENT DOCUMENTS

| | | | | |
|---|---|---|---|---|
| CN | 109050353 | | 12/2018 | |
| CN | 109094432 | | 12/2018 | |
| EP | 3603454 | A1 * | 2/2020 | ............... B60N 2/07 |
| JP | H1172118 | A * | 3/1999 | |
| KR | 100803305 | | 2/2008 | |
| KR | 101034307 | | 5/2011 | |

* cited by examiner

SECTION A-A

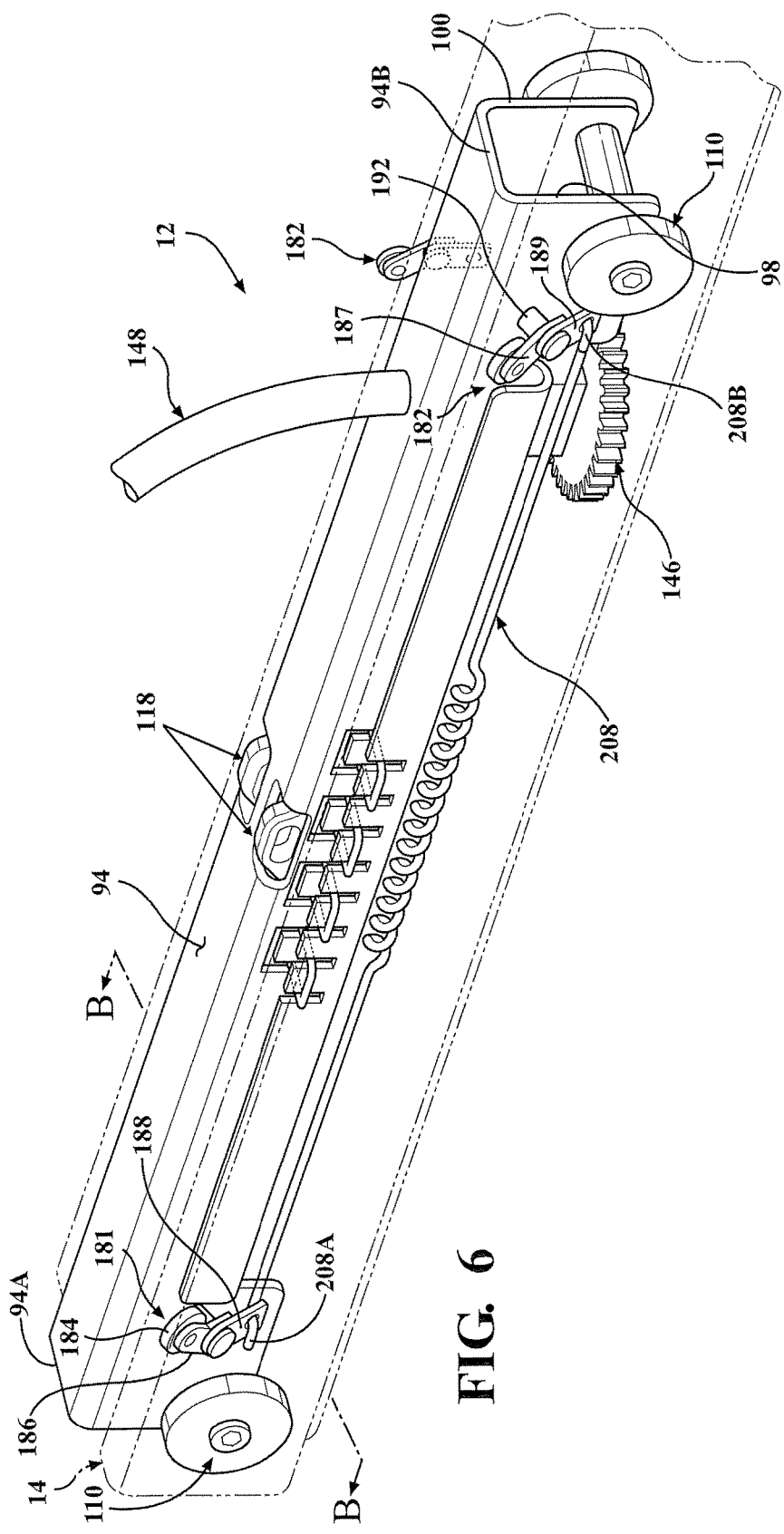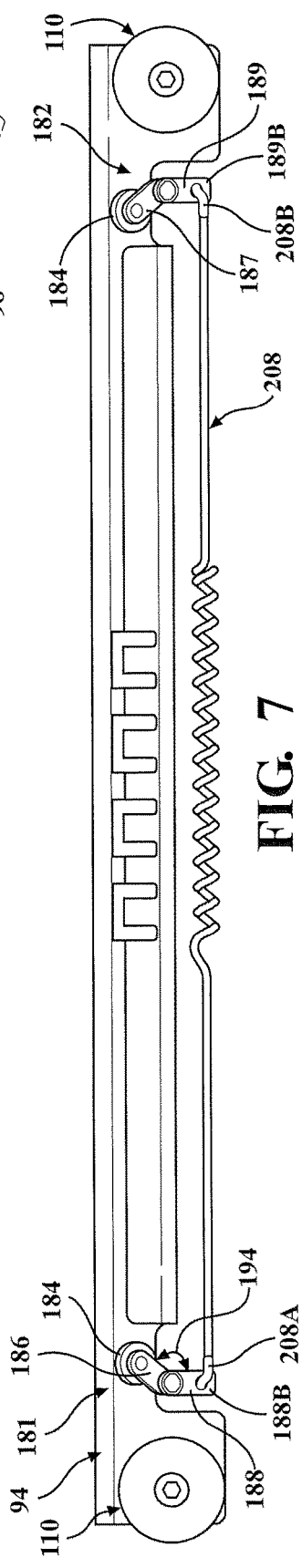

SECTION B-B

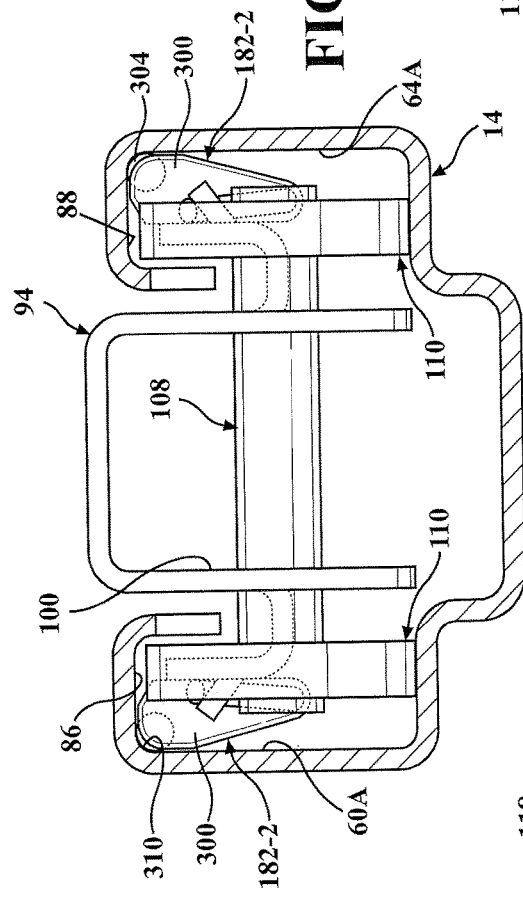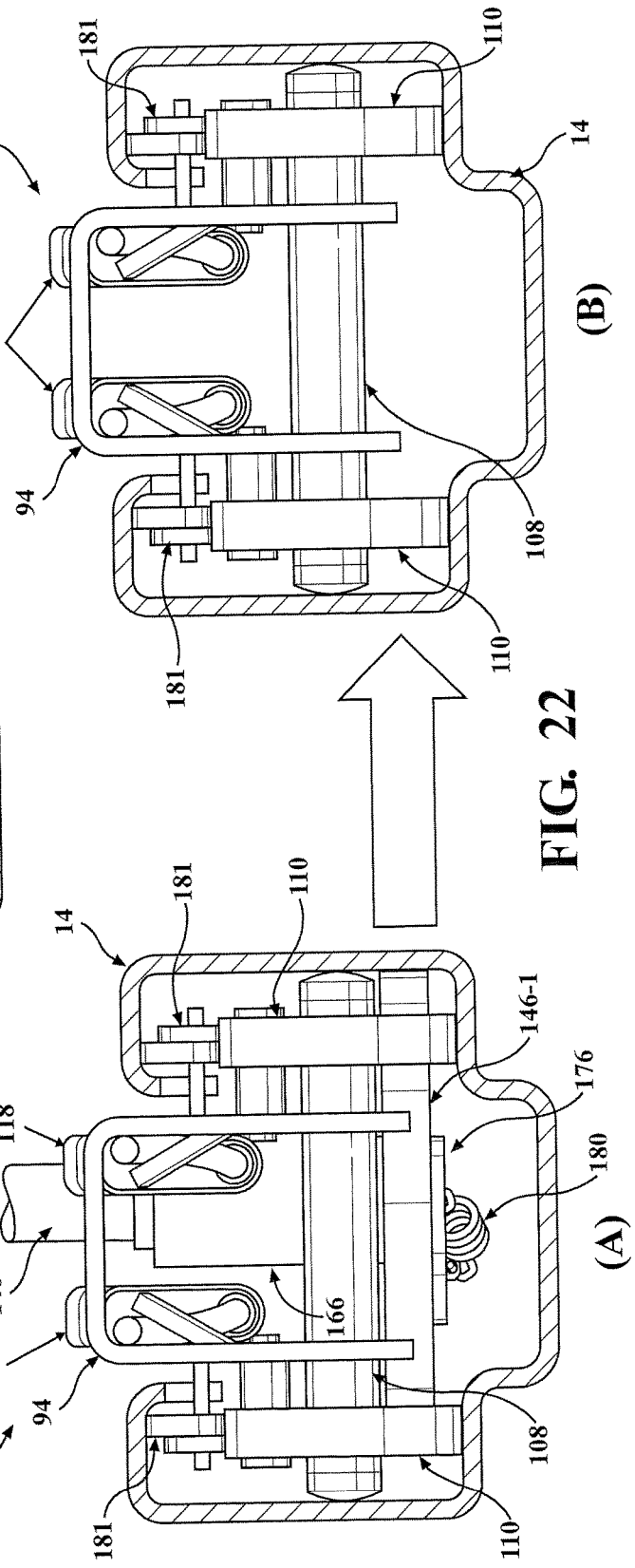

LONG RAIL ASSEMBLY FOR VEHICLE SEAT ADJUSTMENT

CROSS-REFERENCE TO RELATED APPLICATIONS

This application claims priority to U.S. Provisional Application 62/744,357, filed on Oct. 11, 2018, the disclosure of which is incorporated by reference in its entirety.

BACKGROUND OF THE INVENTION

1. Field of the Invention

The present invention relates to a power rail drive assembly that supports a vehicle seat and is configured to travel along a long rail when the vehicle seat is repositioned to another location along the long rail. More particularly, the invention relates to a power long rail drive assembly having a lateral driving wheel inside a channel in the long rail and having stability rolling elements to absorb both vertical and lateral channel variation.

2. Description of Related Art

Various slide mechanisms are known for repositioning a vehicle seat along a long rail in a vehicle. A first known seat sliding device is disclosed in U.S. Pat. No. 10,011,195 wherein a vehicle seat is coupled to a movable rail that is slidable within a C-shaped fixed rail having an upwardly-facing longitudinal opening. The movable rail has rollers on opposing sides of the movable rail that are configured to travel along a track on opposing sides of the C-shaped fixed rail. Second rollers on opposing sides of the movable rail are configured to travel along an upper surface of the fixed rail.

A second known seat sliding device is disclosed in U.S. Pat. No. 8,844,891 wherein a vehicle seat is coupled to a movable rail that is slidable within a C-shaped fixed rail having an upwardly-facing longitudinal opening. The movable rail has a plurality of rolling elements on opposing sides of the movable rail that are configured to travel along a track on opposing sides of the C-shaped fixed rail.

A third known seat sliding device is disclosed in W.O. Publication 2005/068247 wherein a vehicle seat is coupled to a movable rail that is slidable within an omega-shaped fixed rail having an upwardly-facing longitudinal opening. The movable rail has horizontally-extending tabs on opposing sides of the movable rail that are configured to travel along a track on opposing sides of the omega-shaped fixed rail. The movable rail has a connecting portion that extends through the upwardly-facing longitudinal opening in the fixed rail.

A fourth known seat sliding device is disclosed in U.S. Pat. No. 6,691,971 wherein a vehicle seat is coupled to a movable rail that is slidable within a fixed rail. The movable rail has shoes attached to an upper surface of the movable rail to prevent excessive play generated by gaps between the fixed rail and the movable rail.

A fifth known seat sliding device is disclosed in U.S. Pat. No. 7,331,558 wherein a vehicle seat is coupled to a movable rail that is slidable within a fixed rail. The movable rail includes wheels configured to travel along an interior track of the fixed rail. The movable rail includes auxiliary rollers having a vertically-orientated axis of rotation and configured to move along inner side walls of the fixed rail to facilitate a smooth movement of the movable rail within the fixed rail.

All of these seat sliding devices are manually repositioned along the fixed rail since these seat sliding devices lack a power rail drive assembly. Further, these seat sliding devices lack a power-driven lateral driving wheel configured to reposition the rail drive assembly along the fixed rail. Finally, these seat sliding devices lack spring-loaded stability rolling elements to absorb inner channel variations in a vertical and/or lateral direction.

It is desirable, therefore, to have a power rail drive assembly configured to automatically reposition an attached vehicle seat along a long rail. Further, it is desirable to have a lateral driving wheel inside a channel in the long rail such that rotation of the lateral driving wheel transposes the rail drive assembly along the long rail. Also, it is desirable for the power rail drive assembly to include an electric motor operatively coupled to the lateral drive wheel to rotate the lateral drive wheel. Finally, it is desirable for the rail drive assembly to have stability rolling elements to absorb both vertical and lateral channel variation.

SUMMARY OF THE INVENTION

The present invention relates to a long rail assembly for repositioning vehicle seats in a vehicle. The long rail assembly includes a fixed long rail, a power rail drive assembly having a lateral driving wheel configured to move the power rail drive assembly along a channel in the long rail, and spring-loaded stability rolling elements.

BRIEF DESCRIPTION OF THE DRAWINGS

Advantages of the present invention will be readily appreciated as the same becomes better understood by reference to the following detailed description when considered in connection with the accompanying drawings wherein:

FIG. 6 is a cut-away perspective view of a rail drive assembly having spring-loaded stability rolling elements orientated at about a 30 degree angle away from a vertical axis, according to a second embodiment of the present invention;

FIG. 7 is a side view of the rail drive assembly of FIG. 6, according to the second embodiment of the present invention;

FIG. 21 is a cross-sectional end view of the rail drive assembly of FIG. 20, according to the sixth embodiment of the present invention; and FIGS. 22(A) and (B) are cross-sectional end views of the power rail drive assembly and a manual rail drive assembly, respectively, according to a seventh embodiment of the present invention.

DETAILED DESCRIPTION OF THE EMBODIMENTS

FIGS. 1-8 and 10-22 illustrate a long rail assembly having a power rail drive assembly configured to transpose the rail drive assembly along the long rail for vehicle seat adjustment according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
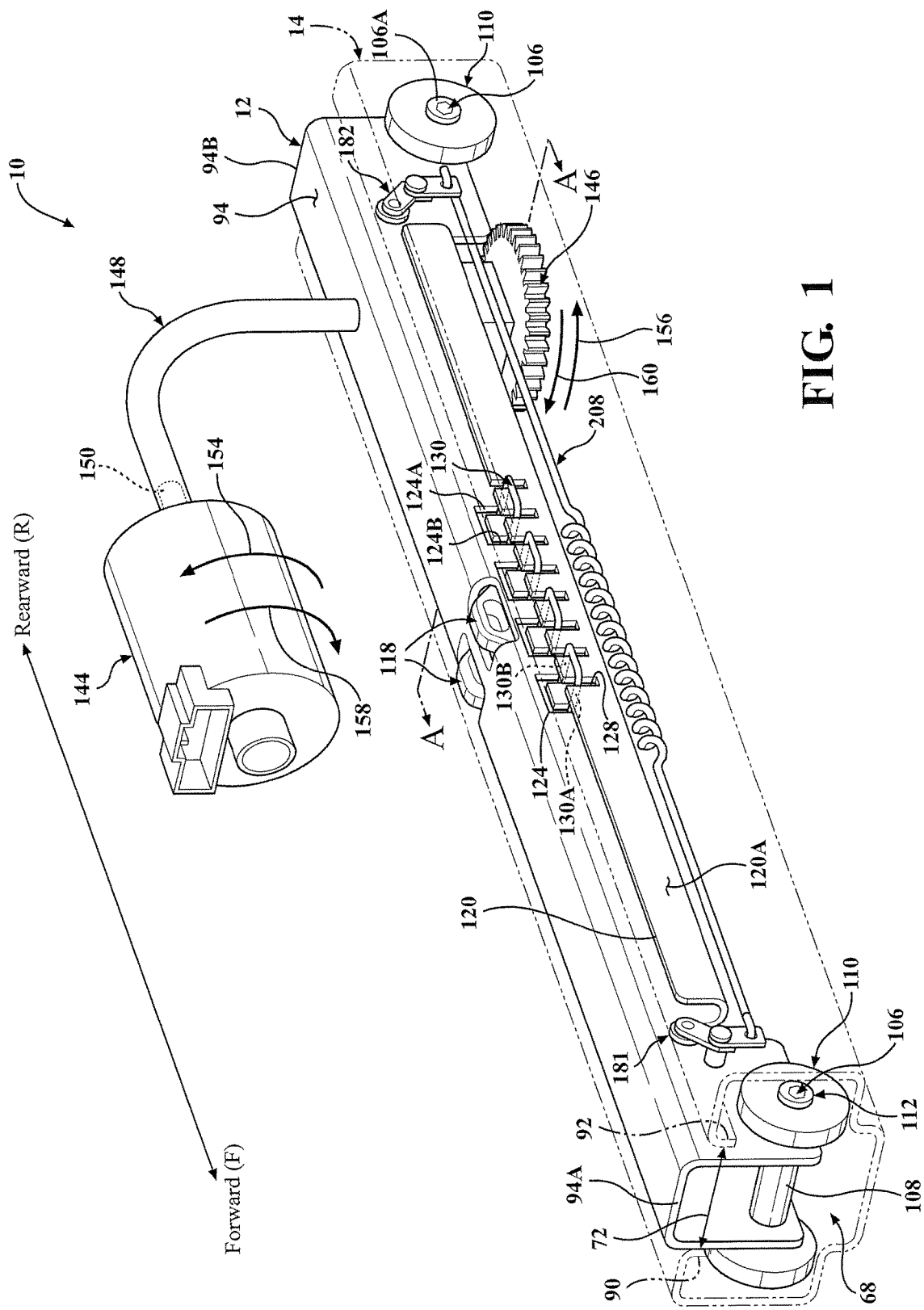
FIG. 1 is a cutaway perspective view of a portion of a long rail including a rail drive assembly according to one embodiment of the present invention.
Figure 2:
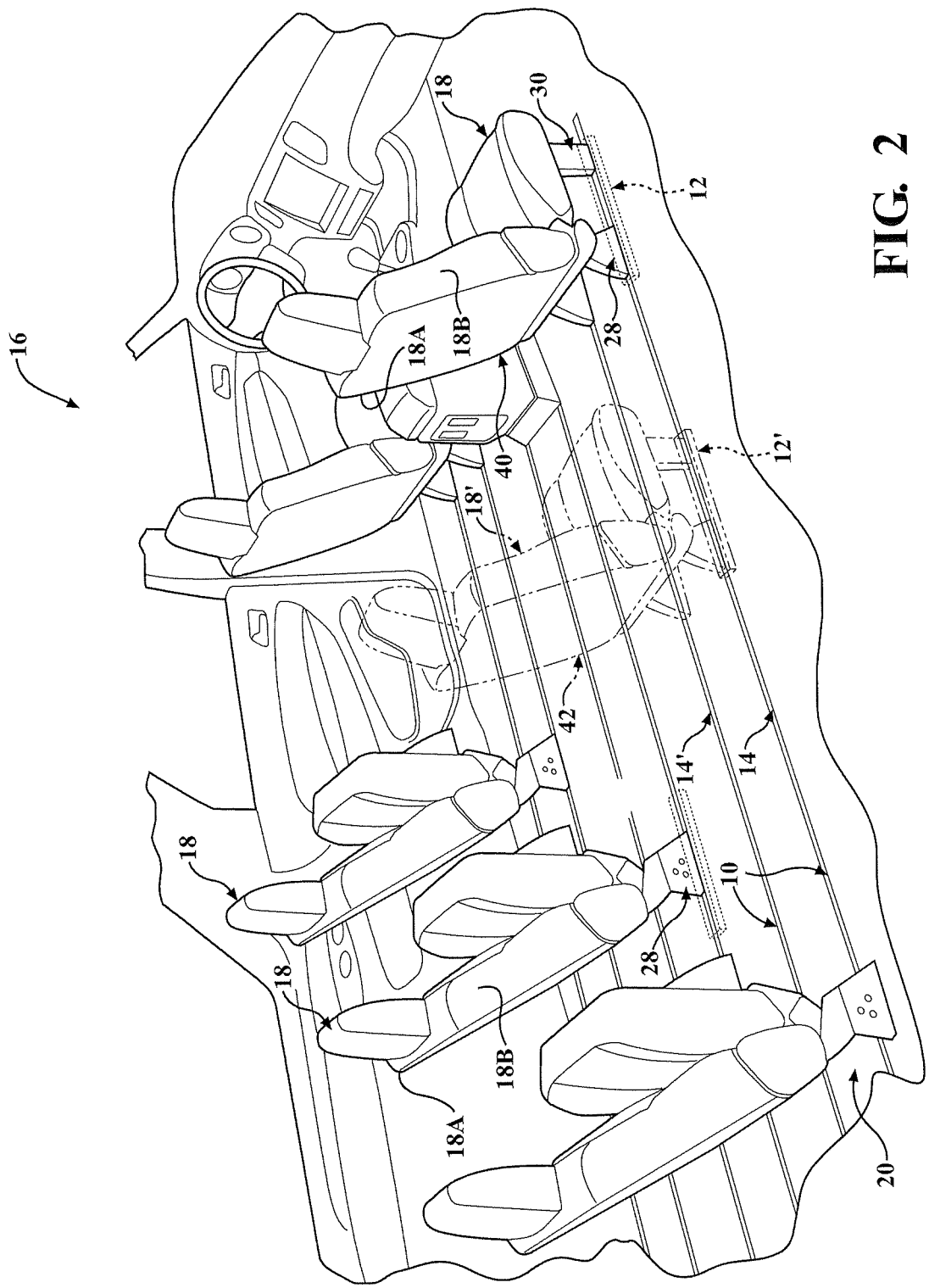
FIG. 2 is a perspective view of a vehicle interior and having vehicle seats coupled to a long rail assembly according to one embodiment of the present invention.
Figure 3:
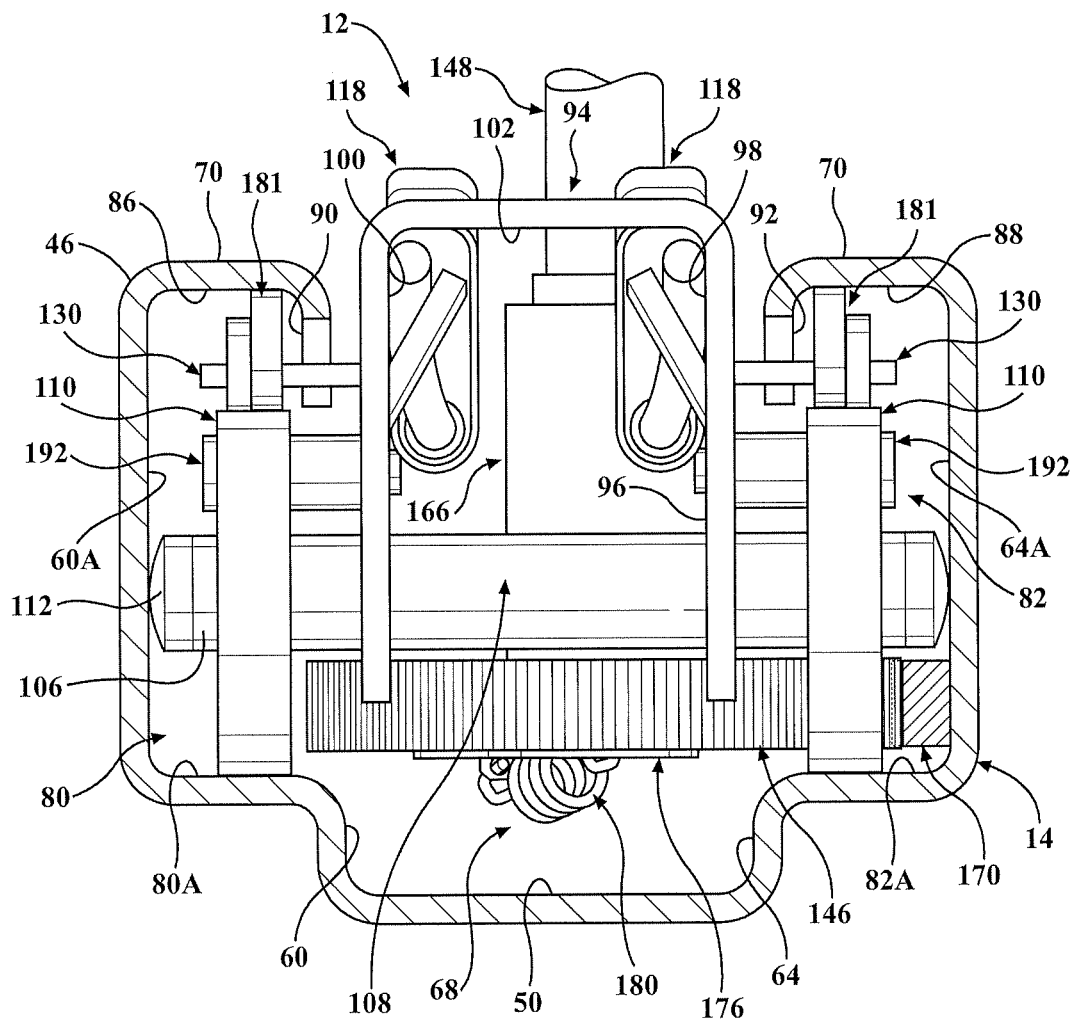
FIG. 3 is a cross-sectional view of the long rail and rail drive assembly of FIG. 1 taken along section line A-A shown in FIG. 1, according to one embodiment of the present invention.
Figure 4:
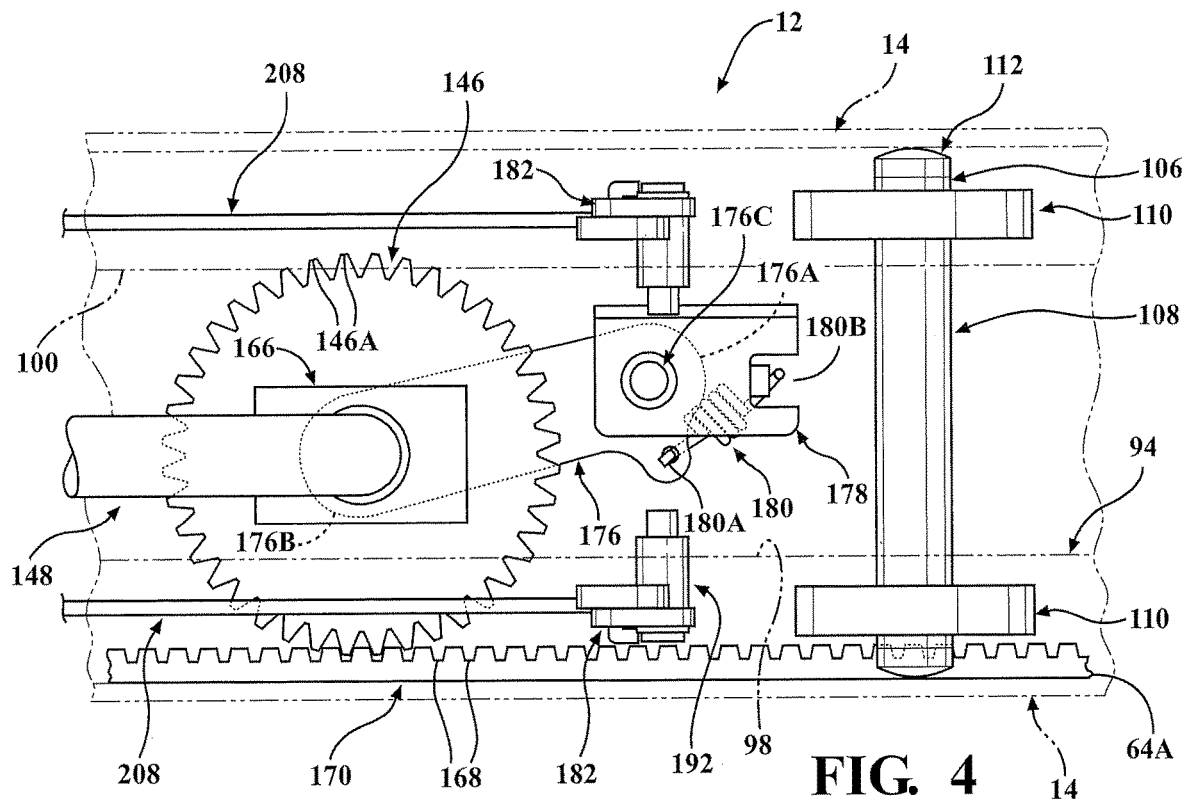
FIG. 4 is a cutaway top view of a portion of the long rail and the rail drive assembly of FIG. 1, according to one embodiment of the present invention.
Figure 5:
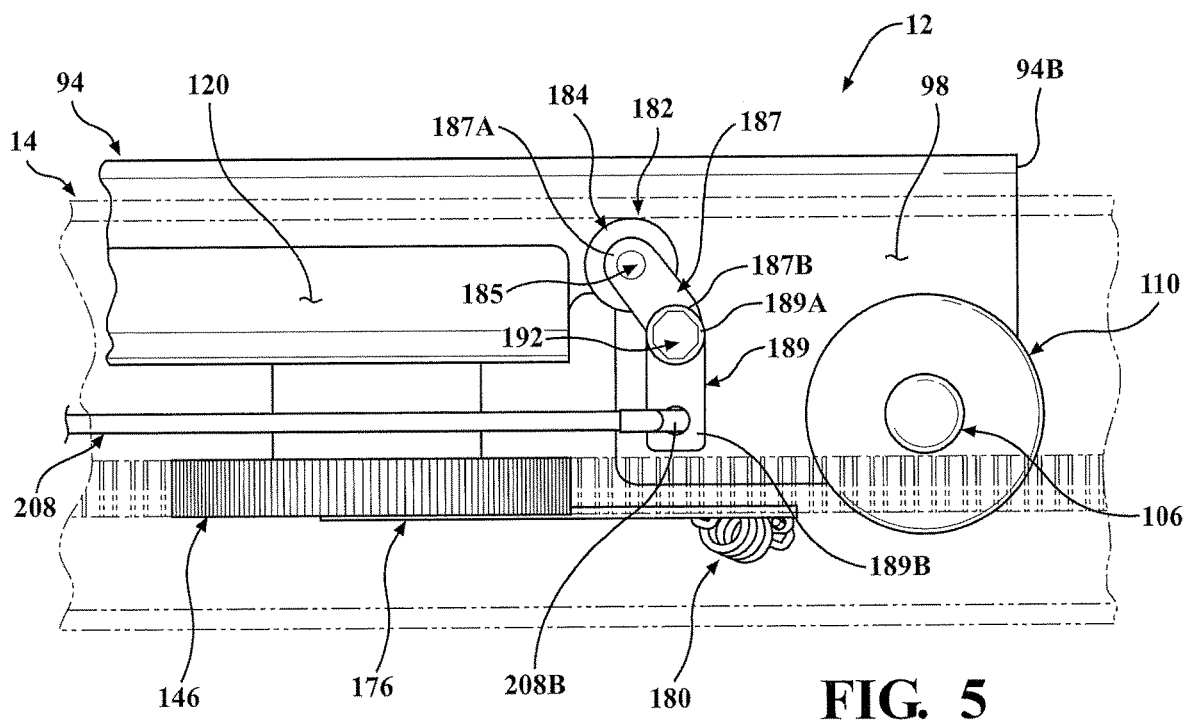
FIG. 5 is a cutaway side view of the portion of the long rail and the rail drive assembly of FIG. 4, according to one embodiment of the present invention.

FIG. 1 illustrates a long rail assembly 10 having a power rail drive assembly 12 for adjusting a position of a vehicle seat along a long rail 14 according to one embodiment of the present invention. FIG. 2 shows a vehicle interior 16 having a plurality of vehicle seats 18 connected to power rail drive assemblies 12 attached to a vehicle floor 20. A cross-sectional view of the long rail 14 and power rail drive assembly 12 of FIG. 1 taken along section line A-A is shown in FIG. 3. FIGS. 4 and 5 show cutaway top and side views, respectively, of the long rail 14 and the power rail drive assembly 12 of FIG. 1, according to one embodiment of the present invention.

Referring to FIG. 2, each vehicle seat 18 is supported by at least one leg 28 on opposing sides 18A, 18B of the vehicle seat 18, and optionally front and rear legs 30, 28 on the opposing sides 18A, 18B of the vehicle seat 18. Each power rail drive assembly 12 travels along one of the fixed long rails 14 attached to the vehicle floor 20. Each vehicle seat 18 travels along a pair of long rails 14, 14' when the vehicle seat 18 is repositioned between a first seat location 40 and a second seat location 42, shown as seat 18' attached to rail drive 12'. The long rails 14 can extend for any length suitable for an intended application. Likewise, any suitable number of long rails 14 can be positioned on the vehicle floor 20 as desired for an intended application. Thus, the long rail assembly 10 allows for improved vehicle seat 18 position adjustment since the vehicle seat 18 coupled to at least one power rail drive assembly 12 is repositionable to any seat position 40, 42 along the at least one fixed long rail 14.

Returning to FIGS. 1 and 3, the long rail 14 has a generally U-shaped cross-sectional profile 46 extending in a longitudinal direction, a bottom wall 50, opposing side walls 60, 64, an interior cavity 68, and a top wall 70 having an elongated opening 72 extending in a longitudinal direction. Each side wall 60, 64 of the long rail 14 includes a track 80, 82 having a generally C-shape cross-sectional profile with each track 80, 82 having a track bottom wall 80A, 82A, a track outer side wall 60A, 64A, a track top wall 86, 88, and a retaining lip 90, 92 extending downward from the track upper wall 86, 88 and spaced apart from the track outer side wall 60A, 64A. As illustrated in FIG. 3, each track bottom wall 80A, 82A is optionally positioned above the bottom wall 50 of the long rail 14. The long rail 14 is a stamped, formed, molded, and/or rolled section of a metal or plastic material and having a length selected based on a specific application. It should be appreciated that the size and shape of the long rail 14 may vary without altering the scope of the invention. The dimensions of the long rail 14, including the cross-sectional profile 46, are selected, in part, based on generally known engineering calculations, finite element analysis (FEA), and physical testing.

Also shown in FIGS. 1 and 3, the power rail drive assembly 12 includes a main body 94 having a generally inverted U-shape cross-section 96 in profile, opposing first and second side walls 98, 100 and a top wall 102 extending between the opposing first and second side walls 98, 100. An axle 106 extends laterally through a hollow tube 108 extending between the opposing side walls 98, 100. A wheel 110 is fixedly coupled to each end 106A of the axle 106. The power rail drive assembly 12 shown in the embodiment of FIG. 1 includes a pair of wheels 110 adjacent to opposing ends 94A, 94B of the main body 94. While not shown, the wheels 110 can be replaced by rollers and/or glides. Any number and/or combination of wheels 110, rollers, and/or glides may be used as suitable for an intended application. Further, each wheel 110 or roller can be rotationally attached to the main body 94 using a shaft (not shown) fixedly coupled to one of the side walls 98, 100 of the main body 94. Each end 106A of each axle 106, and/or shaft, optionally includes a rubber bumper 112 or a similar lateral stability element to assist with centering the power rail drive assembly 12 within the channel 68 of the long rail 14.

A loop latch assembly 118 is integrated with the power rail drive assembly 12, as shown in FIG. 1. A portion of at least one side wall 98, 100 is bent upward to form a generally U-shaped channel 120 having a channel wall 120A spaced apart from at least one side wall 98, 100. A plurality of generally inverted U-shape slots 124, or notches 124, are arranged in the at least one side wall 98, 100 of the main body 94 and spaced apart in a longitudinal direction. Generally vertical notches 128, or slots 128, are spaced apart in the longitudinal direction along the channel wall(s) 120A aligned with a respective side 124A, 124B of the U-shaped slots 124 in the at least one side wall 98, 100. The loop latch assembly 118 includes a plurality of generally U-shaped loops 130 having loop side portions 130A, 130B extending through the U-shaped slots 124 in the at least one side wall 98, 100 and through the slots 128 in the channel wall(s) 120A. While not clearly shown in the Figures, when the power rail drive assembly 12 is assembled with the long rail 14, the retaining lips 92, 90 are positioned between the side walls 98, 100 of the main body 94 and the channel wall(s) 120A. The retaining lips 92, 90 include vertical slots and/or notches (not shown) spaced along the longitudinal length of the retaining lips 92, 90.

As is typical with generally known loop latch assemblies 118 for vehicle seat sliding mechanisms, the loops 130 are moved between a disengaged position (not shown) where the loops 130 are disengaged from the notches in the retaining lips 92, 90 of the long rail 14 and an engaged position (shown in FIG. 1) where the loops 130 are frictionally and/or meshingly engaged with the slots and/or notches in the retaining lips 92, 90 of the long rail 14. When the loops 130 are engaged with the slots and/or notches in the retaining lips 92, 90 of the long rail 14, the power rail drive assembly 12 is locked with the long rail 14 such that the power rail drive assembly 12 is retained in the current position during system loading events. When the loops 130 are moved to the disengaged position with respect to the retaining lips 92, 90 of the long rail 14, the power rail drive assembly 12 is repositionable along the long rail 14. While a loop latch assembly 118 is shown in FIG. 1, it should be appreciated that alternate latching mechanisms can be substituted for the loop latch assembly 118 without altering the scope of the invention.

As also shown in FIG. 1, the power rail drive assembly 12 includes an electric motor 144 operatively coupled to a lateral driving wheel 146. A flexible shaft 148, also described as a "flex shaft" 148, is operatively coupled between an output shaft 150 of the electric motor 144 and the lateral driving wheel 146. Energizing the electric motor 144 to rotate in a first rotational direction 154 rotates the flexible shaft 148 causing the attached lateral driving wheel 146 to rotate in a forward direction 156 and causing the power rail drive assembly 12 to be transposed in a forward direction F along the long rail 14. Energizing the electric motor 144 to rotate in a second rotational direction 158 different than the first rotational direction 154, rotates the flexible shaft 148 causing the attached lateral driving wheel 146 to rotate in a reverse direction 160 and causing the power rail drive assembly 12 to be transposed along the long rail 14 in a rearward direction R. While the electric motor 144 is operatively coupled to the lateral driving wheel 146 through the flexible shaft 148 as shown in the embodiment of FIG. 1, it should be appreciated that alternate operative connections between the electric motor 144 and the lateral driving wheel 146 can be incorporated without altering the scope of the invention. For example, the electric motor 144 can be positioned remotely from the lateral driving wheel 146 and operatively connected to lateral driving wheel 146 through one or more flexible and/or non-flexible shafts 148, and can include one or more gears. Alternatively, the electric motor 144 output shaft 150 can be directly coupled and/or operatively coupled through one or more gears (not shown) to the lateral driving wheel 146, if desired for a specific application without altering the scope of the invention.

Referring to FIGS. 1 and 3-5, the flex shaft 148 is fixedly connected to the lateral driving wheel 146 by a gearbox 166. The lateral driving wheel 146 is a plastic gear 146 having a plurality of gear teeth 146A in the embodiment shown in FIGS. 3-5. The gear teeth 146A of the lateral driving wheel 146 meshingly engage with gear teeth 168 and/or notches 168 in a rack gear 170 fixedly coupled to the side wall 64A of the long rail 14. The rack gear 170 extends longitudinally along a lower portion of the channel 68 in the long rail 14. The lateral driving wheel 146 is not a load-carrying component. While the lateral driving wheel 146 can comprise other materials as desired for an intended application, the plastic gear 146 provides a quiet driving method as the power rail drive assembly 12 travels along the long rail 14. Further, the gear teeth 168 on the rack gear 170 prevent driving slip when the gear teeth 168 meshingly engage with the gear teeth 146A on the lateral driving wheel 146.

Also shown in FIGS. 3-5, the lateral driving wheel 146 is spring-loaded to engage with the rack gear 170 in the lower channel 68. A first end 176A of a support bracket 176 is rotationally coupled to a mounting bracket 178 at pivot 176C, with the mounting bracket 178 being fixedly attached to the side wall 100 of the main body 94. A second end 176B of the support bracket 176 is coupled to the lateral driving wheel 146, with the attachment between the support bracket 176 and the lateral driving wheel 146 being a fixed, rotational, and/or sliding connection as desired for a specific application. A tension spring 180 is fixedly coupled at a first spring end 180A to the support bracket 176 with a second spring end 180B fixedly coupled to the mounting bracket 178 such that the tension spring 180 biases the support bracket 176 and the attached lateral driving wheel 146 towards an engaged position with the rack gear 170. It should be appreciated that the size, shape, and configuration of the support bracket 176, the mounting bracket 178, and the tension spring 180, including attachment locations, may vary without altering the scope of the invention.

Figure 8:
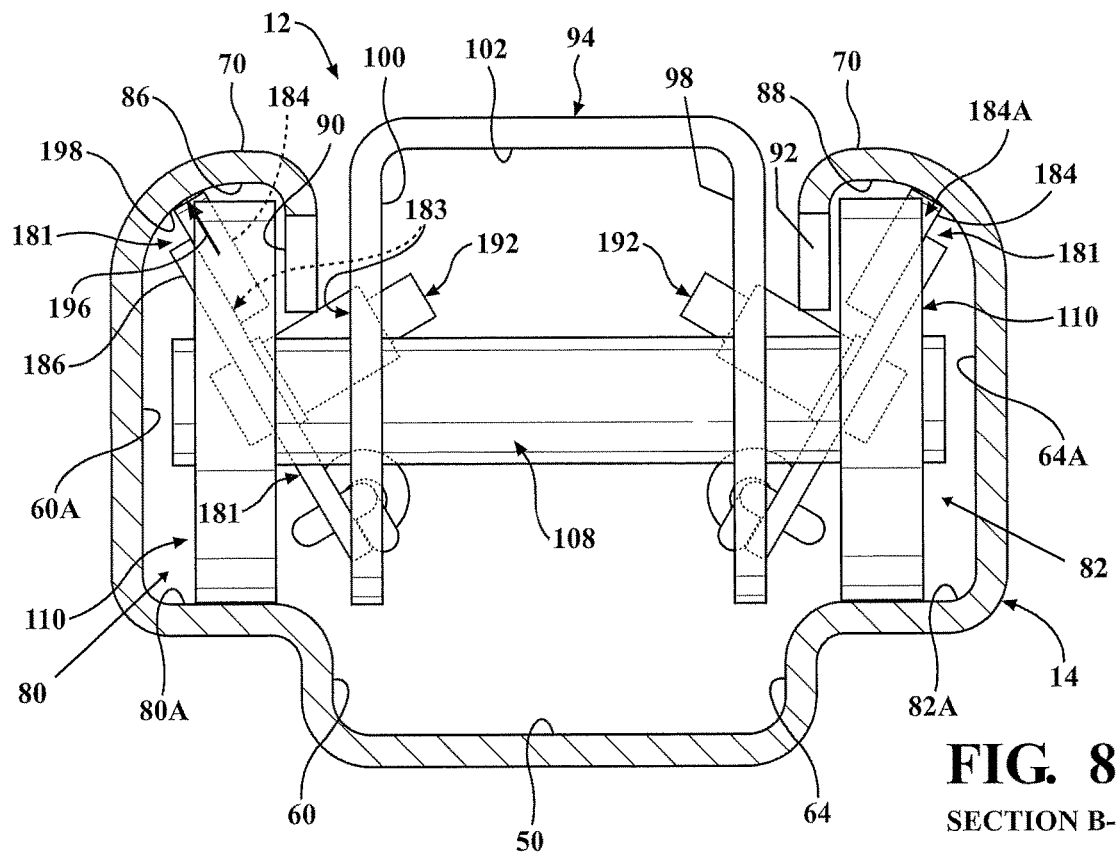
FIG. 8 is cross-sectional end view of the rail drive assembly of FIG. 7, according to the second embodiment of the present invention.

A pair of stability rolling elements 181, 182, shown in FIGS. 1 and 3-8, are rotationally coupled to each side wall 98, 100 of the power rail drive assembly 12. FIG. 6 illustrates a cut-away perspective view of the rail drive assembly 12 and the long rail 14 of FIG. 1 showing the stability rolling elements 181, 182 mounted to the side walls 98, 100 of the long rail 14. FIG. 7 shows a side view of the main body 94 of the rail drive assembly 12, the wheels 110, and stability rolling elements 181, 182. FIG. 8 is a cross-sectional end view taken along section B-B of FIG. 6 showing the stability rolling elements 181, 182 being mounted at an angle 183 to the side walls 98, 100 of the main body 94. While the stability rolling elements 181, 182 can be mounted at any suitable angle 183 to the side walls 98, 100 of the main body 94, in the embodiment shown in FIG. 8 the stability rolling elements 181, 182 are mounted at about a 30 degree angle 183 to the respective side wall 98, 100.

Each stability rolling element 181, 182 includes a roller 184, an upper arm 186, 187, a lower arm 188, 189, and a support stud 192. Referring to FIG. 5, the roller 184 is rotationally coupled to pivot 185 near one end 187A of the upper arm 187. A second end 187B of the upper arm 187 is rotationally coupled to the support stud 192. The support stud 192 is fixedly coupled to an adjacent side wall 98, 100 at a mounting angle 183, such as about 30 degrees as shown in FIG. 8. Alternatively, the support stud 192 can extend generally perpendicular from the side wall 98, 100 of the main body 94 as illustrated in FIG. 3. As also shown in FIG. 3, the upper arms 186, 187 can be aligned generally parallel to the side walls 98, 100 of the main body 94. Thus, the support stud 192, upper arms 186, 187, lower arms 188, 189 can be orientated at any suitable angle with respect to the side walls 98, 100 of the main body 94 suitable for a specific application without altering the scope of the invention.

Also shown in FIG. 5, an upper end 189A of the lower arm 189 is rotationally coupled to the support stud 192. The lower end 187B of the upper arm 187 is fixedly coupled to the upper end 189A of the lower arm 189 so they are linked together to move as one arm. Alternatively, the upper arm 187 and the lower arm 189 can be replaced by a single arm if desired.

As illustrated in a second embodiment shown in FIGS. 6 and 7, each upper arm 186, 187 may be mounted at an angle 194 to the adjacent lower arm 188, 189. Optionally, a pair of stability rolling elements 181, 182 are attached to each side 98, 100 of the main body 94 with each of the upper arms 186, 187 of the stability rolling elements 181, 182 angled towards the opposing upper arm 187, 186.

Referring to FIG. 7, a first end 208A of a torsion spring 208 is connected to a lower end 188B of the lower arm 188 of the first stability rolling element 181. A second end 208B of the torsion spring 208 is connected to a lower end 189B of the lower arm 189 of the second stability rolling element 182. The torsion spring 208 biases the rollers 184 of the stability rolling elements 181, 182 towards the adjacent long rail 14 upper wall 86, 88 and/or side walls 60A, 64A.

The spring-loaded rollers 184, shown in the embodiment of FIG. 8, are mounted at an angle 183 of about 30 degrees to the adjacent side walls 100, 98 of the main body 94. Further, a large corner radius 196, i.e., a curved surface, extends between the upper walls 86, 88 and the side walls 60A, 64A of the long rail 14, as shown in FIG. 8. The large corner radius 196 reduces the amount of noise caused by the roller 184 sliding along its rotational axis. It should be appreciated that the angular relationship between the roller 184 and the attached upper arm 186 with respect to the adjacent side walls 100, 98 of the main body 94, as well as the corner radius 196, can vary without altering the scope of the invention. In the embodiment shown in FIG. 8, the angle 183 and the radius 196 are selected such that a rolling surface 184A of the roller 184 generally frictionally engages with a curved portion 198 extending between the side walls 60A, 64A and the upper walls 86, 88 of the long rail 14. The roller 184 absorbs channel 68 variations in both a lateral and a vertical directions since the roller 184 is angled at about 30 degrees from the side walls 100, 98 of the main body 94.

Figure 9:
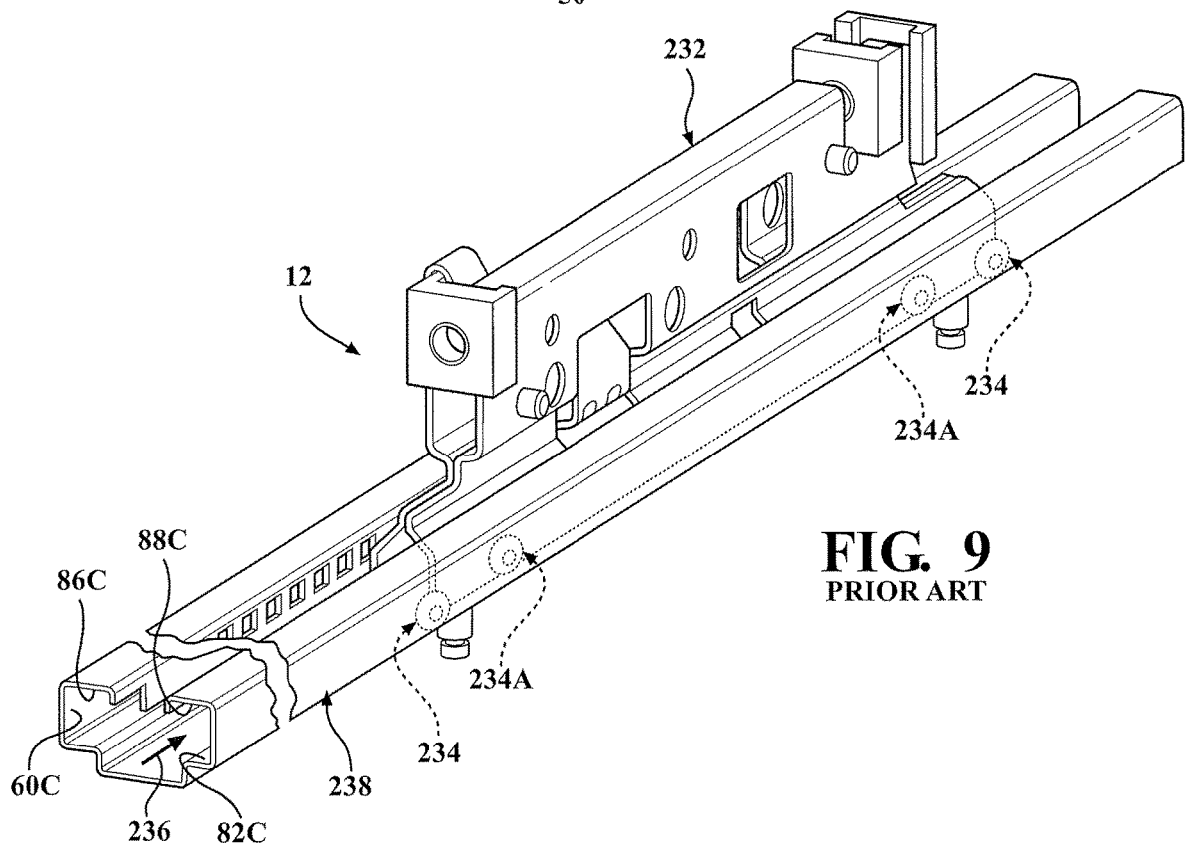
FIG. 9 is a perspective view of a known seat sliding device coupled with a long rail.

In contrast to the embodiments shown in FIGS. 1-8, a conventional long rail system 230 is shown in FIG. 9. The exemplary conventional long rail system 230 includes a movable carrier 232 having wheels 234, 234A configured to travel along a channel 236 in a long rail 238. The channel 236 includes a lower track surface 82C and an upper track surface 88C. Wheels 234 are configured to frictionally engage and travel along the lower track surface 82C. Wheels 234A are configured to frictionally engage and travel along the upper track surface 88C. The wheels 234A lack a spring-loading mechanism. In addition, the conventional carrier 232 lacks a power-driven lateral driving wheel 146 such as shown in FIG. 1. Finally, the channel 236 lacks a large radius 196 between a side wall 60C and an upper wall 86C, such as shown in the embodiment of FIG. 8.

Figure 10:
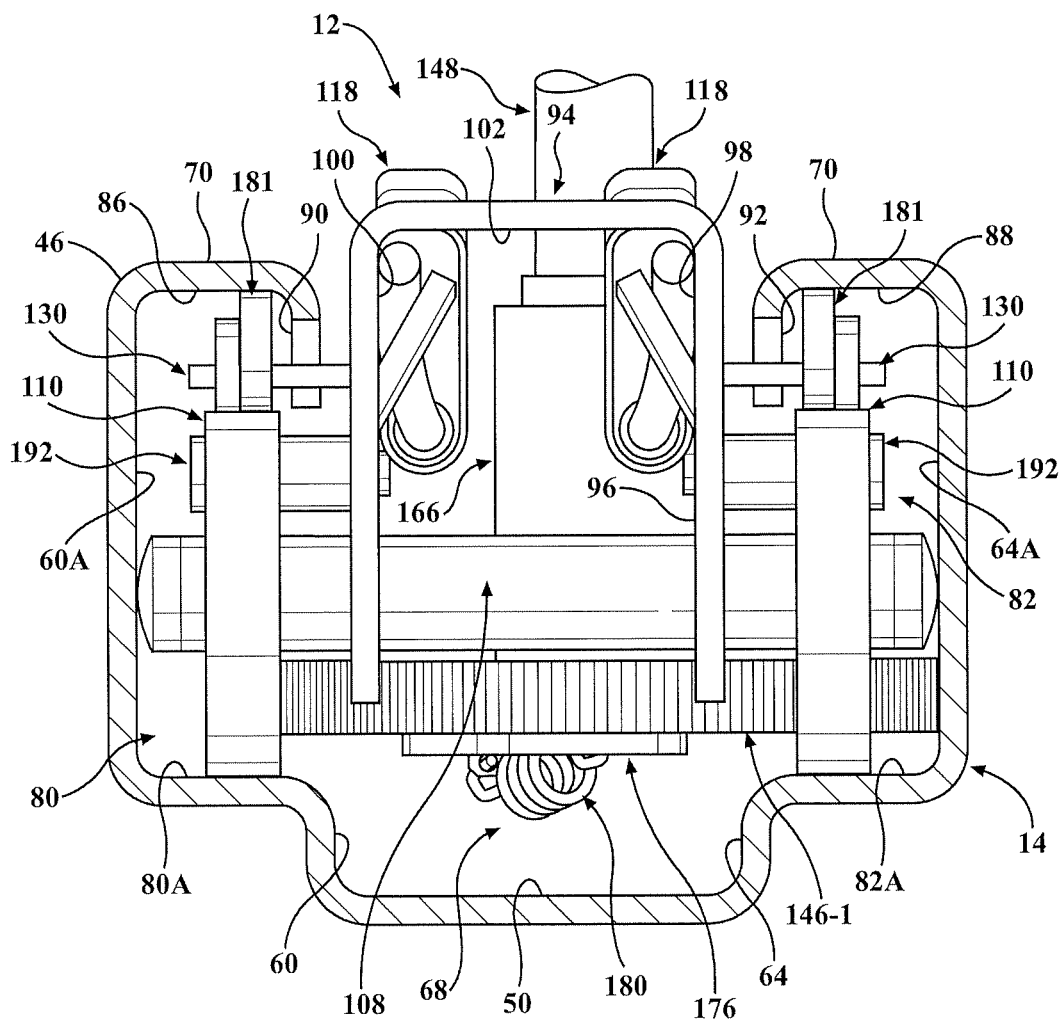
FIG. 10 is a cross-sectional end view of a rail drive assembly having a rubber lateral driving wheel, according to a third embodiment of the present invention.
Figure 11:
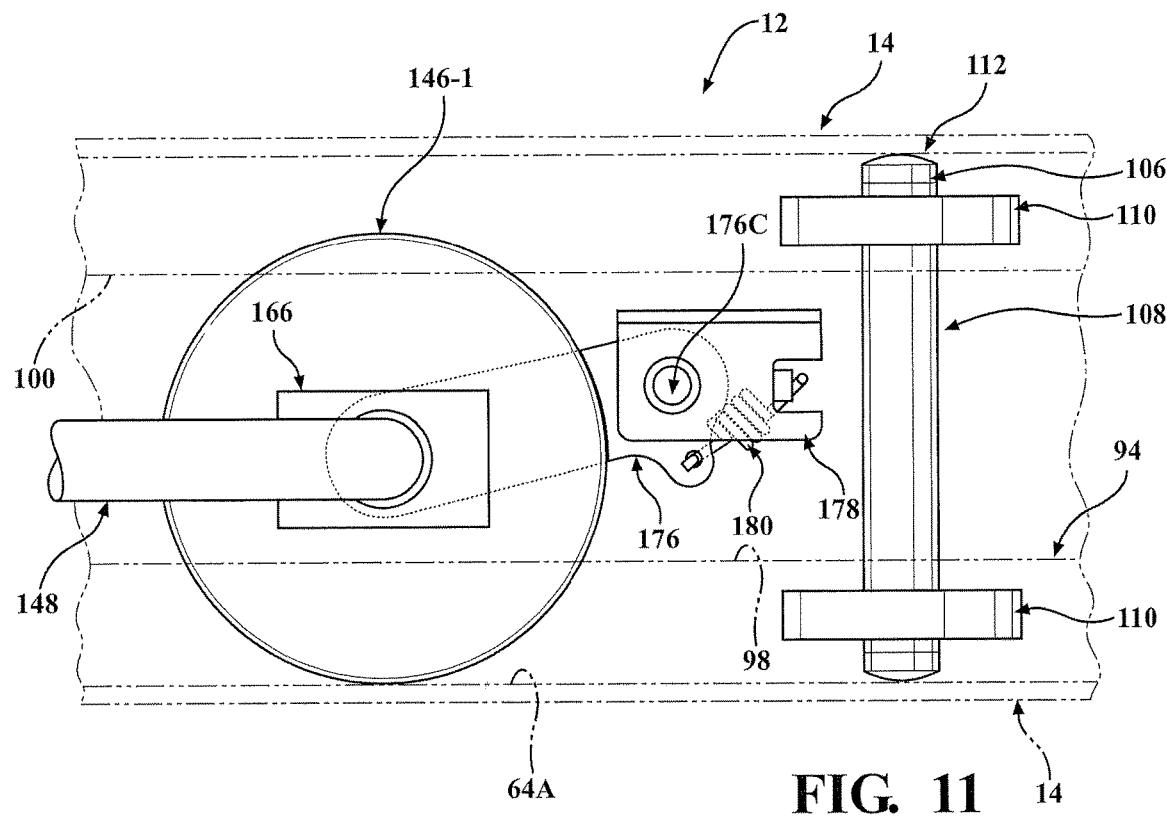
FIG. 11 is a cut-away top view of the rail drive assembly of FIG. 10, according to the third embodiment of the present invention.
Figure 12:
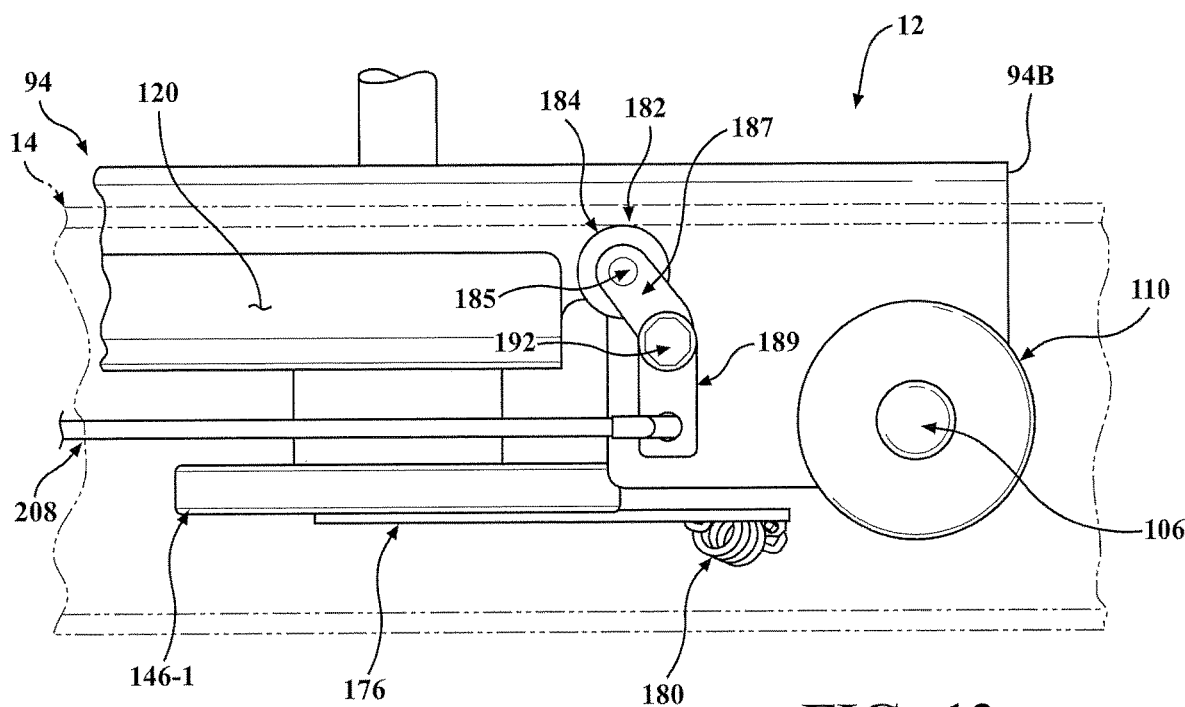
FIG. 12 is a cut-away side view of the rail drive assembly of FIG. 11, according to the third embodiment of the present invention.

A third embodiment of the power rail drive assembly 12 is shown in FIGS. 10-12 wherein the plastic gear 146 and rack gear 170 shown in FIGS. 3-5 are replaced by a rubber wheel 146-1 configured to frictionally engage with the inner side wall 64A of the long rail 14. A cross-sectional view of the long rail 14 and power rail drive assembly 12 of FIG. 1 taken along section line A-A is shown in FIG. 10 and illustrates the rubber wheel 146-1 in place of the plastic gear 146 and the rack gear 170. FIGS. 11 and 12 show cutaway top and side views, respectively, of the long rail 14 and the power rail drive assembly 12 of FIG. 10, according to the third embodiment of the present invention. The rubber wheel 146-1 is spring-loaded to roll against the generally vertical side wall 64A of the track 82. The rubber wheel 146-1 also provides a quiet driving method. The stability rolling elements 182 have been omitted from FIG. 11 for clarity.

Figure 13:
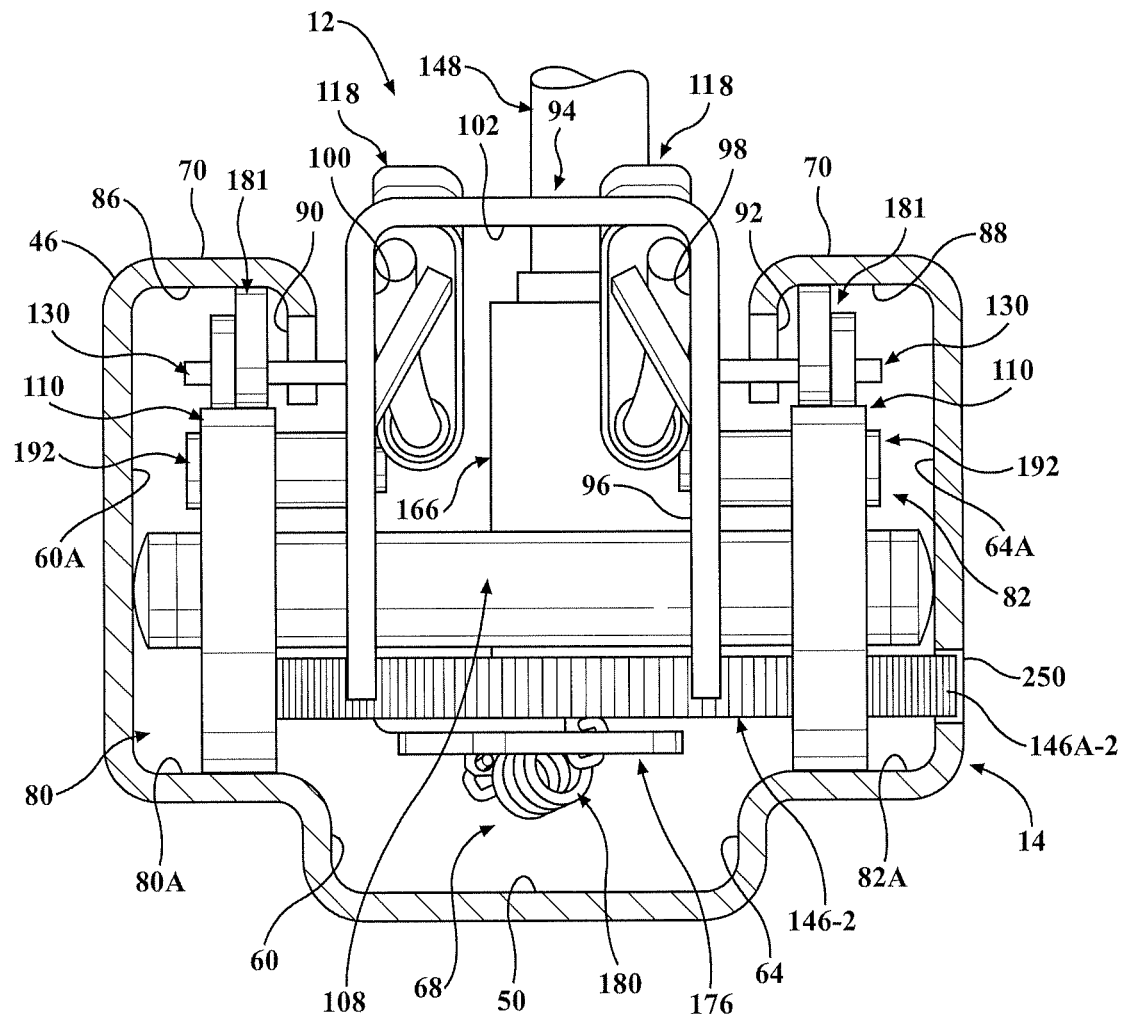
FIG. 13 is a cross-sectional end view of a rail drive assembly having a plastic driving gear, according to a fourth embodiment of the present invention.
Figure 14:
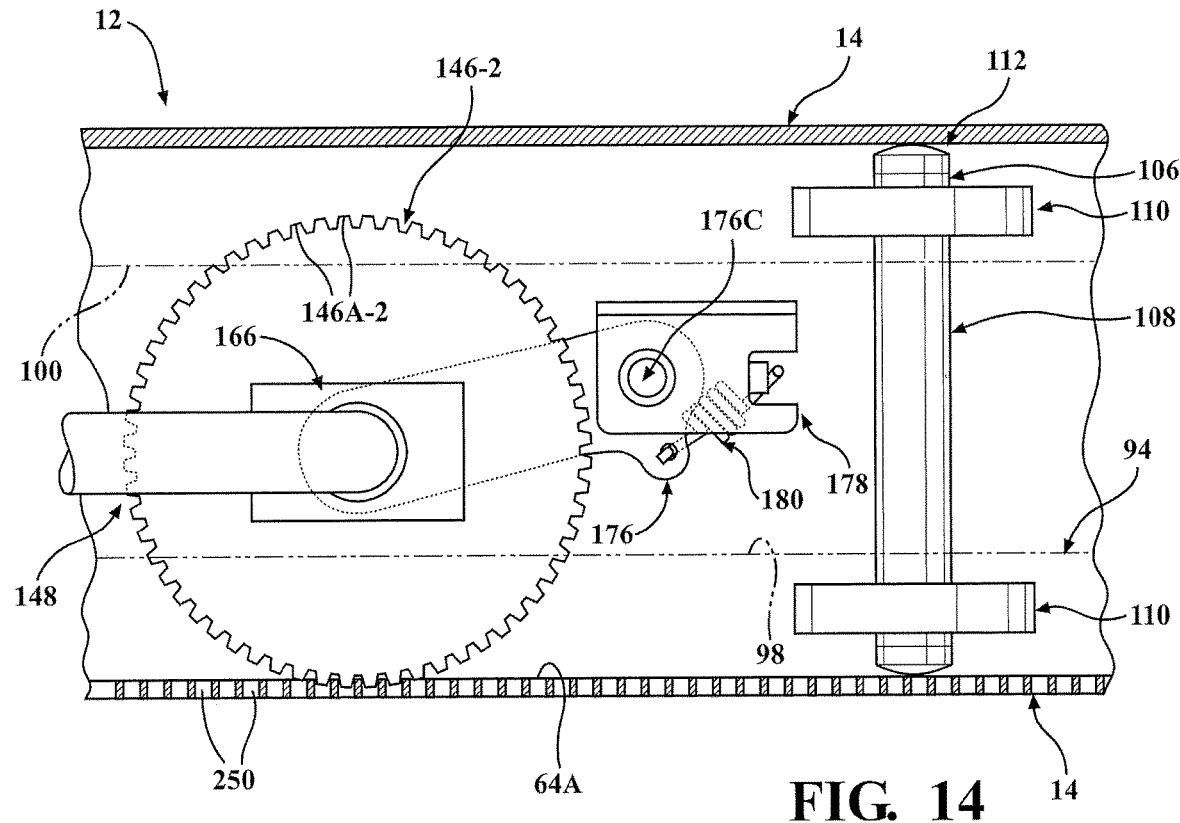
FIG. 14 is a cut-away top view of the rail drive assembly of FIG. 13, according to the fourth embodiment of the present invention.
Figure 15:
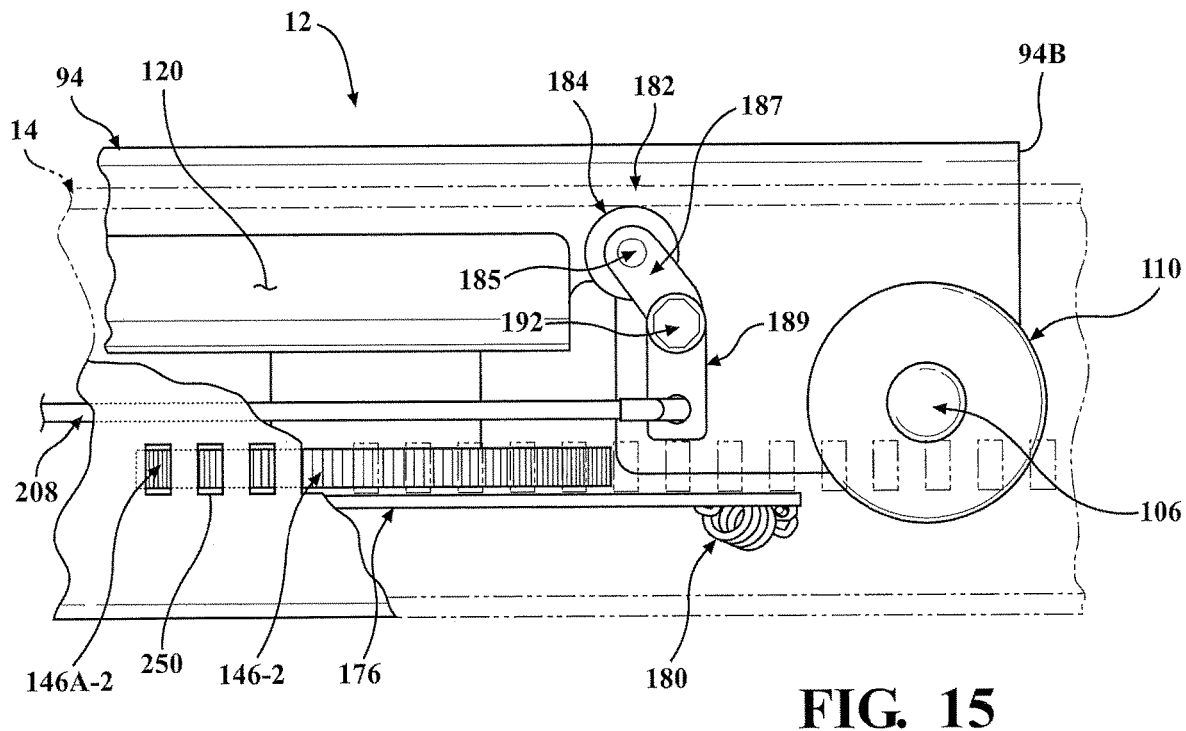
FIG. 15 is a cut-away side view of the rail drive assembly of FIG. 14, according to the fourth embodiment of the present invention.

A fourth embodiment of the power rail drive assembly 12 is shown in FIGS. 13-15 wherein the plastic gear 146 and rack gear 170 shown in FIGS. 3-5 are replaced by a plastic gear 146-2 having a plurality of gear teeth 146A-2 configured to frictionally and/or meshingly engage with cut-out windows 250 in the inner side wall 64A of the long rail 14. A cross-sectional view of the long rail 14 and power rail drive assembly 12 of FIG. 1 taken along section line A-A is shown in FIG. 13 and illustrates the plastic gear 146-2 and the cut-out windows 250 in place of the plastic gear 146 and the rack gear 170. FIGS. 14 and 15 show cutaway top and side views, respectively, of the long rail 14 and the power rail drive assembly 12 of FIG. 13, according to the fourth embodiment of the present invention. The plastic gear 146-2 is spring-loaded to frictionally and/or meshingly engage with the cut-out windows 250 in the vertical side wall 64A of the track 82. The plastic gear 146-2 also provides a quiet driving method. As with the previous embodiments, the plastic gear 146-2 is not a load-carrying component. Further, gear teeth 146A-2 of the plastic gear 146-2 meshingly engaging with the cut-out windows 250 reduces and/or prevents slip of the power rail drive assembly 12 along the long rail 14. The stability rolling elements 182 have been omitted from FIG. 14 for clarity.

Figure 16:
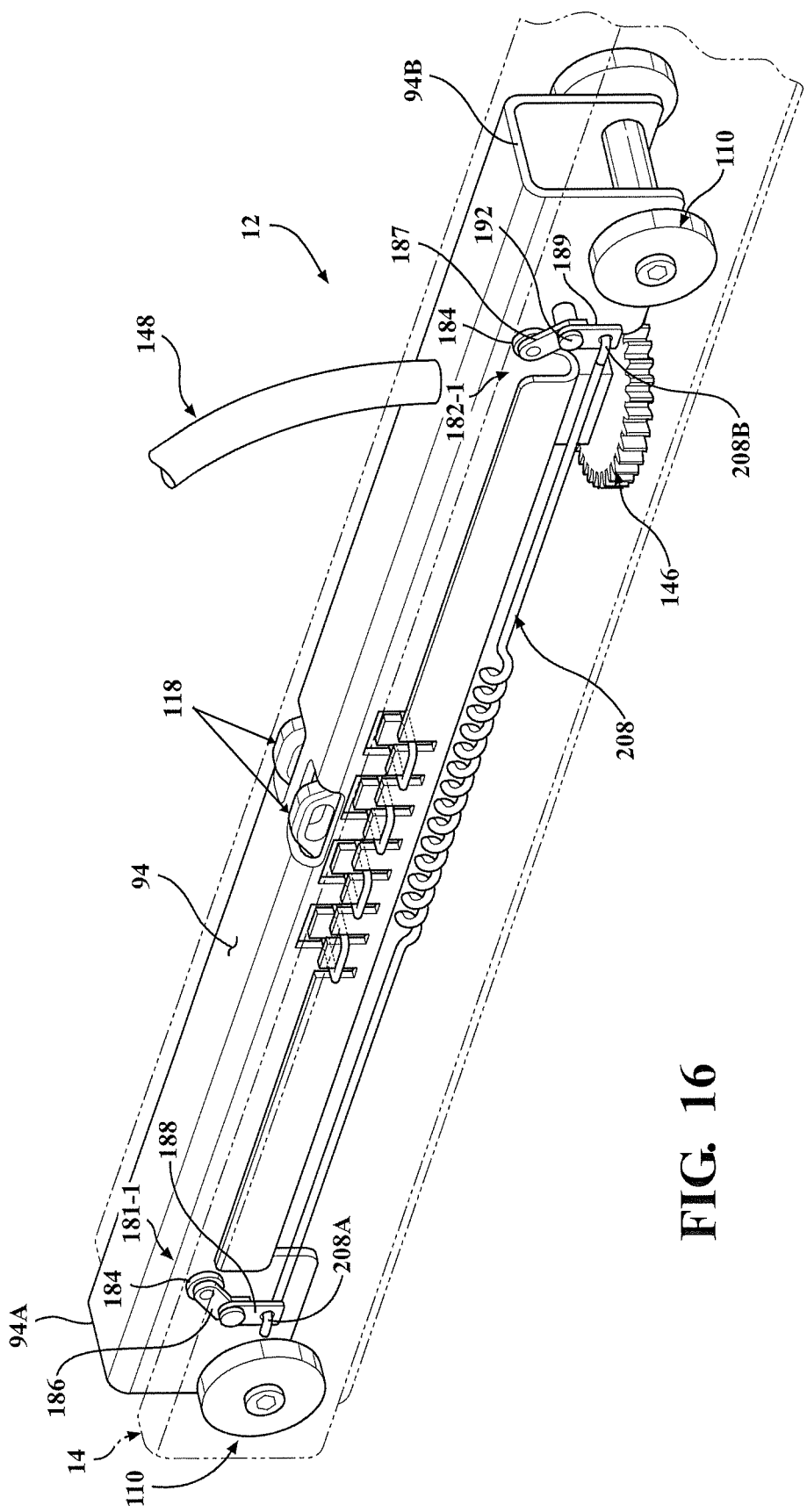
FIG. 16 is a cutaway perspective view of a rail drive assembly having spring-loaded stability rolling elements generally aligned with a vertical axis, according to a fifth embodiment of the present invention.
Figure 17:
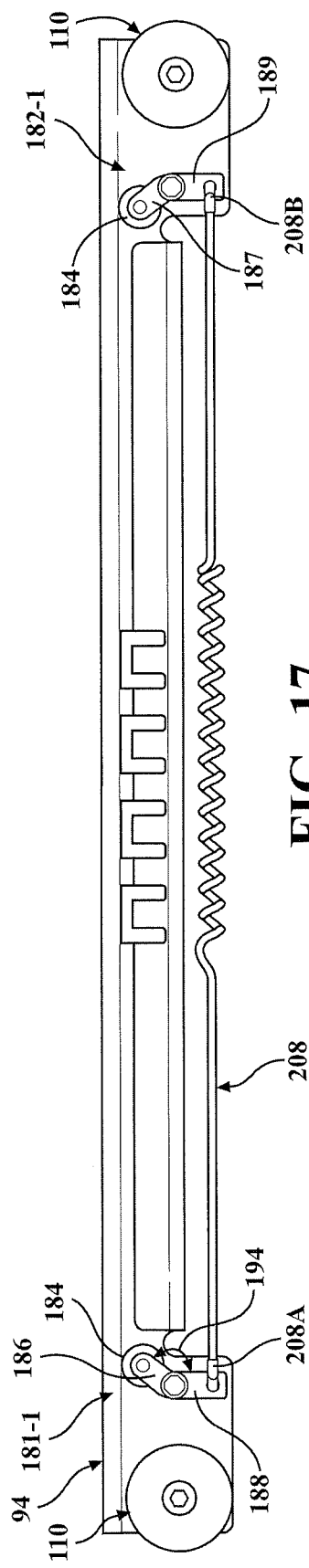
FIG. 17 is a side view of the rail drive assembly of FIG. 16, according to the fifth embodiment of the present invention.
Figure 18:
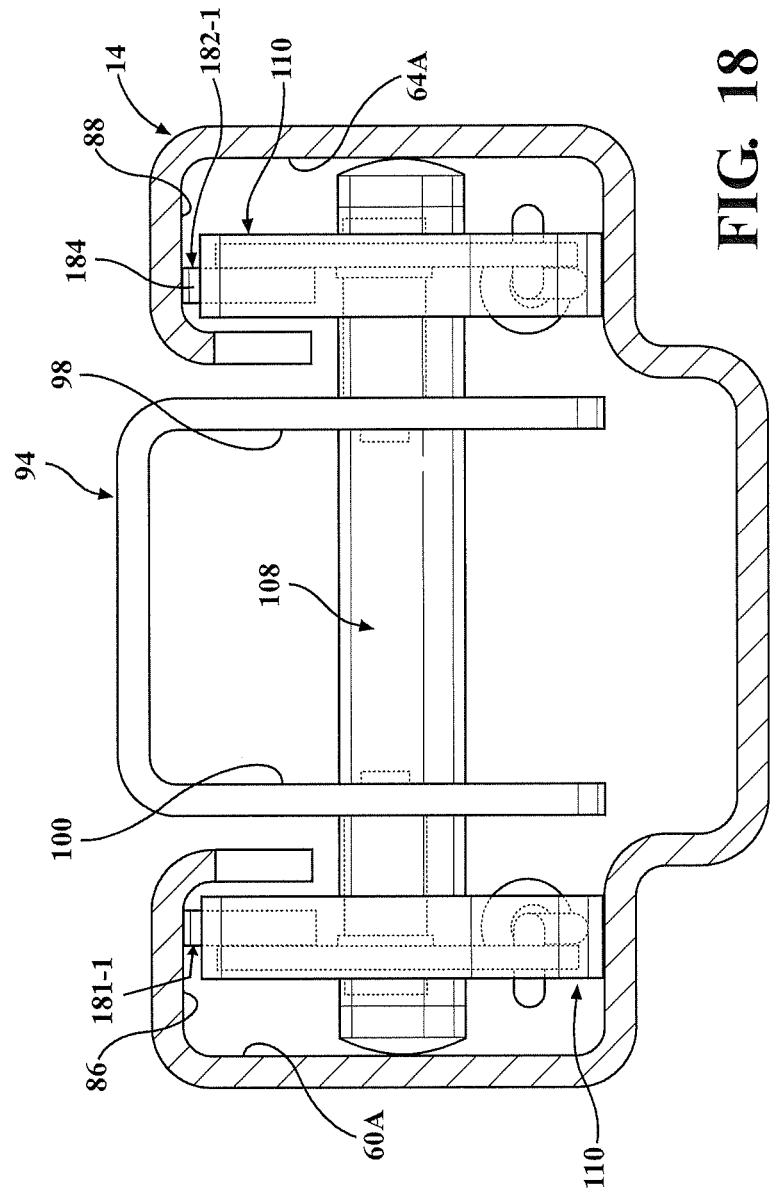
FIG. 18 is a cross-sectional end view of the rail drive assembly of FIG. 17, according to the fifth embodiment of the present invention.

A fifth embodiment of the power rail drive assembly 12 is shown in FIGS. 16-18. FIG. 16 is similar to the embodiment shown in FIG. 1. However, the stability rolling elements 181, 182 have been replaced by stability rolling elements 181-1 and 182-1. A side view and cross-sectional end view are shown in FIGS. 17 and 18, respectively, and illustrates the stability rolling elements 181-1, 182-1 and the attached rollers 184 being orientated generally parallel with the side walls 98, 100 of the main body 94. Further, the bend between the side walls 60A, 64A and the upper walls 86, 88 of the long rail 14 has a smaller bend radius than the bend radius 196 shown in FIG. 8. The stability rolling elements 181-1, 182-1 are spring-loaded to frictionally engage with the upper surfaces 86, 88 of the long rail 14.

Figure 19:
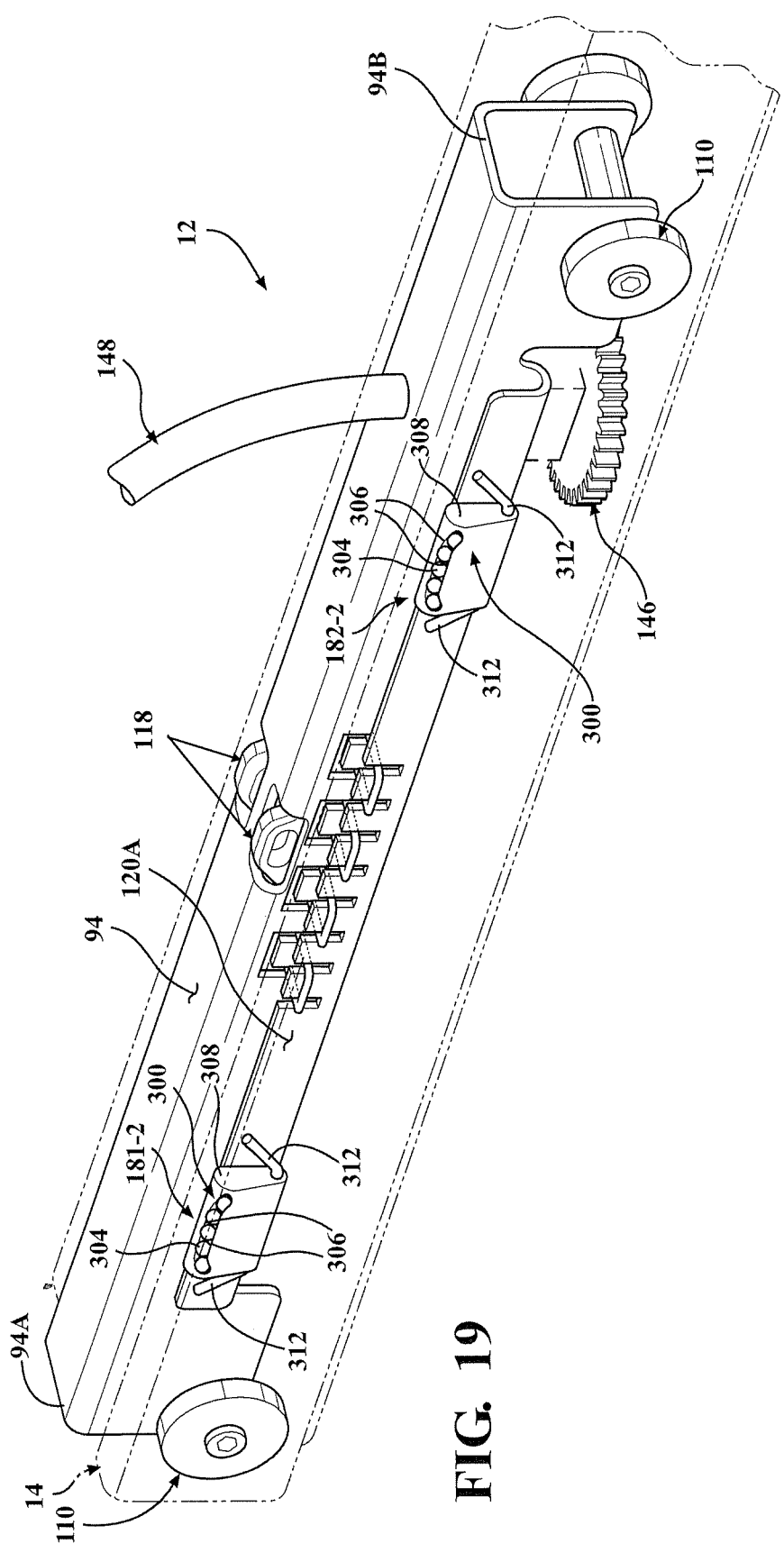
FIG. 19 is a cutaway perspective view of a rail drive assembly having spring-loaded self-circulation units for stability rolling elements, according to a sixth embodiment of the present invention.
Figure 20:
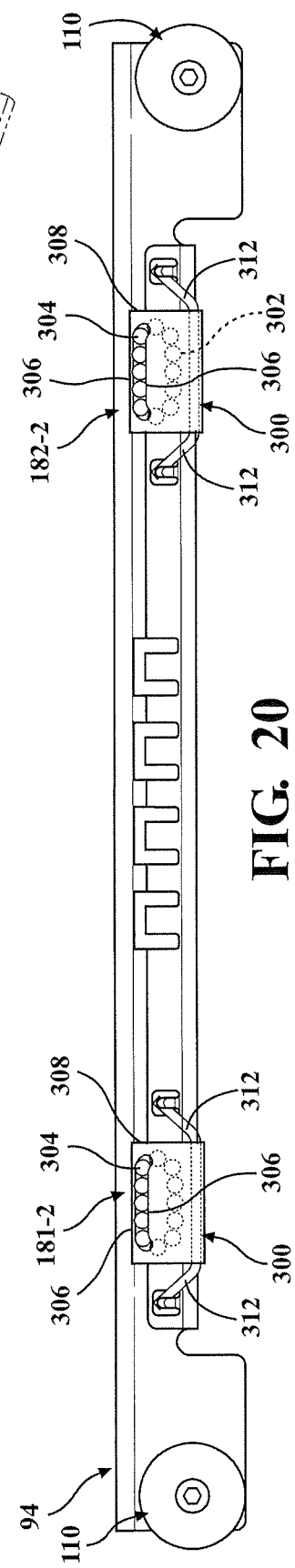
FIG. 20 is a side view of the rail drive assembly of FIG. 19, according to the sixth embodiment of the present invention.

A sixth embodiment of the power rail drive assembly 12 is shown in FIGS. 19-21. The stability rolling elements 181, 182 have been replaced by spring-loaded self-circulation units 181-2, 182-2. Each spring-loaded self-circulation unit 181-2, 182-2 includes a module 300 having an internal channel 302. A plurality of ball bearings 304 can travel along the internal channel 302. The module 300 includes a slot 306 extending along an upper portion 308 of the module 300. The slot 306 is configured such that the ball bearings 304 partially protrude through the slot 306. The module 300 is spring-loaded towards an upper corner 310 between the upper walls 86, 88 and the side walls 60A, 64A of the long rail 14 by a leaf spring 312 passing between the module 300 and the channel wall 120A of the main body 94.

As illustrated in FIG. 22, the power rail drive assembly 12 including the motor 144, flex shaft 148, gearbox 166, and lateral driving wheel 146-1 shown in FIG. 22(A) can be removed to form a manual rail drive assembly 12M, as shown in FIG. 22(B). The stability rolling elements 181, 182 can be used with both the power rail drive assembly 12 and with the manual rail drive assembly 12M.

One benefit of a long rail assembly having a power rail drive assembly is the power rail drive assembly can automatically transpose an attached vehicle seat along a fixed rail. Another benefit of the power rail drive assembly having a lateral driving wheel is the lateral driving wheel can be a plastic gear and/or a rubber wheel since the lateral driving wheel is not a load-carrying component. A third benefit is the lateral driving wheel provides a quiet driving mechanism since the lateral driving wheel is a plastic gear and/or a rubber wheel. A fourth benefit of the long rail assembly is including stability rolling elements spring-loaded towards an interior surface of the fixed rail to absorb channel variation.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A long rail assembly for transposing a vehicle seat along a vehicle floor, the long rail assembly comprising:
   a fixed long rail extending in a longitudinal direction having an interior cavity with a generally U-shaped cross-section in profile, said fixed long rail including a bottom wall extending between a first wall and a second wall, each of said first wall and said second wall including a track having a generally C-shaped cross-section in profile and including a track bottom wall, a track outer wall, and a track top wall, and said fixed long rail having an elongated opening extending in said longitudinal direction and spaced between said track top walls; and
   a rail drive assembly configured to be repositionable along said interior cavity of said fixed long rail, said rail drive assembly comprising:
      a main body having a generally inverted U-shaped cross-section in profile extending in said longitudinal direction, said main body having a first side wall, a second side wall, and a top wall extending between said first side wall and said second side wall;
      a front axle and a rear axle extending laterally though said first side wall and said second side wall, each of said front axle and said rear axle having a first axle end and a second axle end fixedly coupled to a respective wheel which is configured to travel longitudinally in said tracks in said fixed long rail; and
      at least one stability rolling element operatively coupled to one of said first side wall and said second side wall of said main body, said at least one stability rolling element is spring-loaded to frictionally engage with said fixed long rail on one of said track outer walls, said track top walls, or a curved portion extending between one of said track top walls and an adjacent one of said track outer walls of said fixed long rail;
      wherein said at least one stability rolling element comprises an upper arm and a roller rotationally coupled to said upper arm, said upper arm being rotationally coupled to one of said first side wall and said second side wall of said main body.

2. The long rail assembly as set forth in claim 1, wherein said at least one stability rolling element comprises a first stability rolling element and a second stability rolling element, said first stability rolling element and said second stability rolling element are operatively coupled to one of said first side wall and said second side wall of said main body.

3. The long rail assembly as set forth in claim 2, wherein said at least one stability rolling element comprises a third stability rolling element and a fourth stability rolling element, said third stability rolling element and said fourth stability rolling element are operatively coupled to an other one of said first side wall and said second side wall of said main body.

4. The long rail assembly as set forth in claim 3, wherein said rail drive assembly includes an electric motor operatively coupled to a driving wheel configured to engage with said fixed long rail in a lateral direction and configured to translate said rail drive assembly along said fixed long rail when said electric motor is energized.

5. The long rail assembly as set forth in claim 4, wherein said driving wheel is spring-loaded towards an engagement surface.

6. The long rail assembly as set forth in claim 5, wherein said driving wheel comprises a plastic gear having a plurality of gear teeth.

7. The long rail assembly as set forth in claim 6, wherein a rack gear is fixedly coupled to one of said track outer walls of said fixed long rail, said rack gear having a plurality of rack teeth extending in said longitudinal direction and configured to matingly engage with said plurality of gear teeth of said plastic gear.

8. The long rail assembly as set forth in claim 6, wherein one of said track outer walls of said fixed long rail includes a plurality of cut-out notches extending in said longitudinal direction configured to matingly engage with said plurality of gear teeth of said plastic gear.

9. The long rail assembly as set forth in claim 4, wherein said driving wheel comprises a rubber wheel configured to frictionally engage with one of said track outer walls of said fixed long rail.

10. The long rail assembly as set forth in claim 4, wherein said rail drive assembly further comprises:
    a mounting bracket attached to one of said first side wall and said second side wall of said main body;
    a support bracket rotatably coupled to said mounting bracket and said driving wheel is rotatably coupled with said support bracket; and
    a first spring coupled between said support bracket and said mounting bracket, said first spring configured to bias said driving wheel towards one of said track outer walls of said fixed long rail.

11. The long rail assembly as set forth in claim 10, wherein said first spring is a tension spring.

12. The long rail assembly as set forth in claim 11, wherein said electric motor includes an output shaft which is operatively coupled to said driving wheel by a flexible drive shaft.

13. The long rail assembly as set forth in claim 1, wherein:
    said at least one stability rolling element further comprises a support stud fixedly coupled to one of said first side wall and said second side wall of said main body; and
    said upper arm is rotationally coupled to said support stud.

14. The long rail assembly as set forth in claim 13, wherein:
    said at least one stability rolling element further comprises a lower arm; and said lower arm is rotationally coupled to said support stud and fixedly coupled to said upper arm.

15. The long rail assembly as set forth in claim 14, wherein:
said at least one stability rolling element comprises a first stability rolling element and a second stability rolling element;
said rail drive assembly further comprises a spring coupled between a lower arm of said first stability rolling element and a lower arm of said second stability rolling element; and
said spring is configured to bias said lower arm of said first stability rolling element towards said lower arm of said second stability rolling element.

16. The long rail assembly as set forth in claim 14, wherein said roller has a horizontal axis of rotation.

17. The long rail assembly as set forth in claim 14, wherein said roller has an axis of rotation that is not perpendicular to an adjacent one of said first side wall and said second side wall of said main body.

18. The long rail assembly as set forth in claim 17, wherein an angle between said roller and said adjacent one of said first side wall and said second side wall of said main body is about 30 degrees.

19. The long rail assembly as set forth in claim 18, wherein said upper arm of said at least one stability rolling element is not parallel to said lower arm of said at least one stability rolling element.

20. The long rail assembly as set forth in claim 19, wherein an angle between said upper arm of said at least one stability rolling element and said lower arm of said at least one stability rolling element is about 30 degrees.

21. A long rail assembly for transposing a vehicle seat along a vehicle floor, the long rail assembly comprising:
a fixed long rail extending in a longitudinal direction having an interior cavity with a generally U-shaped cross-section in profile, said fixed long rail including a bottom wall extending between a first wall and a second wall, each of said first wall and said second wall including a track having a generally C-shaped cross-section in profile and including a track bottom wall, a track outer wall, and a track top wall, and said fixed long rail having an elongated opening extending in said longitudinal direction and spaced between said track top walls; and
a rail drive assembly configured to be repositionable along said interior cavity of said fixed long rail, said rail drive assembly comprising:
a main body having a generally inverted U-shaped cross-section in profile extending in said longitudinal direction, said main body having a first side wall, a second side wall, and a top wall extending between said first side wall and said second side wall;
a front axle and a rear axle extending laterally though said first side wall and said second side wall, each of said front axle and said rear axle having a first axle end and a second axle end fixedly coupled to a respective wheel which is configured to travel longitudinally in said tracks in said fixed long rail;
at least one stability rolling element operatively coupled to one of said first side wall and said second side wall of said main body, said at least one stability rolling element is spring-loaded to frictionally engage with said fixed long rail on one of said track outer walls, said track top walls, or a curved portion extending between one of said track top walls and an adjacent one of said track outer walls of said fixed long rail;
said at least one stability rolling element comprises a self-circulation unit;
said self-circulation unit being coupled to an adjacent one of said first side wall and said second side wall of said main body by a leaf spring; and
said self-circulation unit comprising a module having an internal channel, a plurality of ball bearings in said internal channel, a module wall having an elongated slot configured to retain said plurality of ball bearings within said module while a portion of at least one ball bearing extends through said elongated slot in said module wall and frictionally engages with said fixed long rail.

22. A long rail assembly for transposing a vehicle seat along a vehicle floor, the long rail assembly comprising:
a fixed long rail extending in a longitudinal direction having an interior cavity with a generally U-shaped cross-section in profile, said fixed long rail including a bottom wall extending between a first wall and a second wall, each of said first wall and said second wall including a track having a generally C-shaped cross-section in profile and including a track bottom wall, a track outer wall, and a track top wall, and said fixed long rail having an elongated opening extending in said longitudinal direction and spaced between said track top walls; and
a rail drive assembly configured to be repositionable along said interior cavity of said fixed long rail, said rail drive assembly comprising:
a main body having a generally inverted U-shaped cross-section in profile extending in said longitudinal direction, said main body having a first side wall, a second side wall, and a top wall extending between said first side wall and said second side wall;
a front axle and a rear axle extending laterally though said first side wall and said second side wall, each of said front axle and said rear axle having a first axle end and a second axle end fixedly coupled to a respective wheel which is configured to travel longitudinally in said tracks in said fixed long rail; and
at least one stability rolling element operatively coupled to one of said first side wall and said second side wall of said main body, said at least one stability rolling element is spring-loaded to frictionally engage with said fixed long rail on one of said track outer walls, said track top walls, or a curved portion extending between one of said track top walls and an adjacent one of said track outer walls of said fixed long rail;
said at least one stability rolling element comprises a first stability rolling element and a second stability rolling element;
said rail drive assembly further including a spring operatively coupled between said first stability rolling element and said second stability rolling element; and
said spring is configured to bias said first stability rolling element towards said second stability rolling element.

* * * * *